United States Patent
Schmidt et al.

(10) Patent No.: US 12,166,564 B2
(45) Date of Patent: Dec. 10, 2024

(54) ADJUSTING POLARIZATION STATES FOR WIRELESS TRANSMISSION

(71) Applicant: IPCom GmbH & Co. KG, Pullach (DE)

(72) Inventors: Andreas Schmidt, Braunschweig (DE); Maik Bienas, Schoeppenstedt (DE)

(73) Assignee: IPCom GmbH & Co KG, Pullach (DE)

( * ) Notice: Subject to any disclaimer, the term of this patent is extended or adjusted under 35 U.S.C. 154(b) by 0 days.

(21) Appl. No.: 17/754,731

(22) PCT Filed: Oct. 27, 2020

(86) PCT No.: PCT/EP2020/080134
§ 371 (c)(1),
(2) Date: Apr. 11, 2022

(87) PCT Pub. No.: WO2021/083866
PCT Pub. Date: May 6, 2021

(65) Prior Publication Data
US 2024/0014883 A1 Jan. 11, 2024

(30) Foreign Application Priority Data
Oct. 29, 2019 (EP) .................... 19205849

(51) Int. Cl.
*H04B 7/10* (2017.01)
(52) U.S. Cl.
CPC ................... *H04B 7/10* (2013.01)

(58) Field of Classification Search
CPC ...................................................... H04B 7/10
See application file for complete search history.

(56) References Cited

U.S. PATENT DOCUMENTS

| | | | |
|---|---|---|---|
| 10,116,065 B2 | 10/2018 | Pan | |
| 2007/0082623 A1* | 4/2007 | Mattheijssen | H04L 1/0001 455/101 |
| 2007/0135050 A1 | 6/2007 | Schiff | |
| 2008/0232502 A1 | 9/2008 | Wild et al. | |
| 2015/0249522 A1* | 9/2015 | Deng | H04L 27/36 375/296 |
| 2015/0333885 A1 | 11/2015 | Athley | |
| 2018/0205438 A1 | 7/2018 | Davydov et al. | |
| 2019/0110216 A1* | 4/2019 | Tong | H04W 24/08 |
| 2020/0007197 A1 | 1/2020 | Kang | |
| 2020/0145069 A1* | 5/2020 | Ferrante | H04B 7/0608 |
| 2020/0214073 A1* | 7/2020 | Shimoda | H04W 76/27 |
| 2020/0229010 A1* | 7/2020 | Soriaga | H04B 17/318 |

FOREIGN PATENT DOCUMENTS

EP 2625795 A 8/2013

* cited by examiner

*Primary Examiner* — David B Lugo
(74) *Attorney, Agent, or Firm* — Proi Intellectual Property US

(57) ABSTRACT

The present invention provides a mechanism for a receiver to determine a quality of orthogonality of received polarized signals by monitoring polarized reference signals $RS_{c,j}$ which either change polarization with time or are aligned with polarized data signals. Depending on the quality, multiplexing may change between polarization division multiplexing and spatial division multiplexing.

15 Claims, 3 Drawing Sheets

ADJUSTING POLARIZATION STATES FOR WIRELESS TRANSMISSION

The present invention relates to a mechanism to detect a suitability for using polarization division multiplexing (PDM) and to optimise polarization settings on a wireless communication link between a transmitter and a receiver, for instance in a cellular communication system operating according to 3GPP's 4G-LTE suite of specifications, or its successor technology which is commonly referred to as 5G-NR.

V. M. Kapinas et al. in a paper entitled "Aspects on Space and Polarization Diversity in Wireless Communication Systems", 15th Telecommunications forum TELFOR 2007 Serbia, Belgrade, Nov. 20-22, 2007 describe the implementation of space and polarization diversity in a communications system. US 2015/0214633 A1 describes a mm-wave MIMO antenna system with two antenna elements for transmitting orthogonally polarized signals.

US 2018/0205438 A1 discusses codebook designs for multiple input multiple output (MIMO) cellular systems in which signals are transmitted via first and second, preferably orthogonal, polarizations in addition to multiple directed beams. Each port corresponds to one steered beam and one polarization with the polarizations being fixed. Reference signals are used to enable a feedback of channel quality information.

US 2008/0232502 A1 concerns a further MIMO system employing beam forming and polarization time coding. The polarizations are fixed at ±45°. In WO 2012/045482 A1 polarized signals with alternating polarization states are described providing a pair of orthogonal polarization states. A relative phase is controlled to ensure the polarization states are orthogonal.

In US 2015/0333885 A1 a dual polarized antenna array transmits reference signals with two different polarizations in a beam forming arrangement in order to obtain angular information to determine an optimum angle of departure to a radio transceiver, the angular information relating to directional information. US 2007/0135050 concerns a satellite communication system in which orthogonal pilot signals are transmitted and the relative received signal strength measured and an indication of the strongest signal reported to a gateway. The two pilot signals may be encoded to identify them. WO 2018/155977A 1, also published as US 2020/0007197 A1, describes a system in which reference signals of first and second polarizations for a plurality of beams are sent and feedback information provided to identify an optimum beam and polarization.

FIG. 1 shows a cellular communication system according to 3GPP. Details of the functional entities shown in FIG. 1 are for instance described in 3GPP TS 36.300 (for 4G-LTE) and 3GPP TS 38.300 (for 5G-NR).

For instance, in case of 5G-NR, the radio access network (RAN) consists of base stations called gNBs, providing user plane (SDAP/PDCP/RLC/MAC/PHY) and control plane (RRC) protocol terminations towards mobile communication devices (UEs). The gNBs are interconnected with each other by means of an Xn interface ("IF2" in FIG. 1). The gNBs are also connected by means of an NG interface ("IF1" in FIG. 1) to the core network (CN), more specifically to the access and mobility management function (AMF, taking care of control-plane or C-Plane traffic) by means of the NG-C interface and to the user plane function (UPF, taking care of user-plane or U-Plane traffic) by means of the NG-U interface. The NG interface supports a many-to-many relation between AMFs/UPFs and gNBs.

Each base station of the cellular communication system may control communication over the air interface within its geographic coverage area, namely in its radio cell. When the mobile communication device (UE) is located in coverage of a radio cell and camping on it (in other words, when it is registered with the radio cell providing coverage) it may communicate with the base station controlling that radio cell. When a call is initiated by the user of the mobile communication device or a call is addressed to the mobile communication device, radio channels may be set up between the mobile communication device and the base station controlling the radio cell in which the mobile communication device is located.

As a mobile communication device moves through a coverage area of the cellular communication system, control of the call may be transferred between neighbouring radio cells. The transfer of calls from one radio cell to another radio cell is usually referred to as handover (or handoff). Handover is usually based on measurements (e.g., measurements of the downlink signal strength on the serving cell and/or at least one different overlapping and/or neighbouring radio cells) performed by the UE as configured by the network.

In this context, the term "call" is intended to cover a wide variety of use cases where user data is being exchanged unidirectionally or bidirectionally over the air interface as part of an active connection (i.e. when the UE is in RRC_CONNECTED state of operation) between a serving base station and a mobile communication device. It can for example be a voice call, a data call, internet data traffic, and much more.

Multiple input multiple output (MIMO) is a technique based on spatial antenna diversity to increase data throughput by using multiple antennas on both a transmitter side and a receiver side. MIMO exploits multipath propagation of wireless information streams (i.e. the so-called diversity gain) and has over the past few years become an essential element of various wireless communication standards, such as WiFi (IEEE 802.11n and IEEE 802.11ac) and 4G-LTE. It is foreseeable that also 5G-NR (4G-LTE's successor technology) will support MIMO operation.

MIMO specifically refers to a method for sending and receiving more than one data stream simultaneously over the same radio channel (i.e. using the same radio resources) to increase the data rate by exploiting multipath propagation.

In MIMO operation, a UE may be instructed by the network to periodically or aperiodically measure the downlink channel properties, to derive a rank indicator (RI) thereof and report it to the network (in a so-called closed-loop method). The RI is an indicator showing how well multiple antenna configuration works, i.e. it indicates how much correlation (or, mutual interference) there is between the various data streams transmitted from the different antennas. "No correlation" means "there is no interference among the different data signals". A lower correlation between the different data streams results in a high RI value which is beneficial for the transmission, as it enables to use the radio resources multiple times.

The maximum RI value is very closely related to the number of antennas. In detail, the maximum RI value is same as the number of antennas on each side, if the number of Tx antenna and Rx antenna is same. If the number of Tx and Rx are different, the one with less antennas is the same as the maximum achievable RI. For example, in case of 2×2 MIMO, the RI value can be "1" or "2". In this case, a value of "2" means "there is no correlation between the signals of different antennas". And a value of "1" means "The signal from the two Tx antennas is perceived by the UE to be like a single signal from a single antenna, which means the worst performance".

The concept of rank indication is important to help the base station in selecting the best suited transmission mode (TM). For example, in case of downlink data transmission, the base station may switch between sending downlink data in Tx Diversity mode or in MIMO mode to the UE. Details about transmission modes in 4G-LTE are summarized below.

The RI is sent by the UE in uplink direction as part of channel state indication (CSI) reporting. CSI may consist of a channel quality indicator (CQI), a precoding matrix indicator (PMI), a precoding type indicator (PTI) and/or an RI. The time and frequency resources that can be used by the UE to report CSI in uplink direction are configurable by the eNB. As such, RIs can arrive at the base station either periodically or irregularly (event triggered).

While the primary design goal of MIMO technology was to enhance the data rate (by transmitting different data streams over the air), at the same time MIMO provides means to make data transmissions more robust (by transmitting differently pre-coded data streams of the same user data packets over the air). In practice, both methods (increase data throughput and improve reliability) are used either separately or in combination, depending on the given channel's condition.

For UEs operating according to 4G-LTE "category 3" (and higher) there are usually multiple antennas that can be used in various downlink transmissions schemes, meaning that the base station (in case of 4G-LTE, the eNode) has multiple Tx antennas and the UE has multiple Rx antenna. Presence of multiple antennas does not automatically mandate a "MIMO" configuration in all cases. For example, two TX antennas on infrastructure side can be used in various ways: One way is to use it as 2×2 MIMO configuration, but you can also use the two antennas in a Tx diversity configuration rather than in a MIMO configuration or you can use only one of the antennas. In some scenarios it may make sense to use various different multiplexing and/or precoding methods (e.g., in addition to the above).

For 4G-LTE special names were defined for each transmission scheme, namely the TM. For example, what is usually called "SISO" (single transmission antenna and single receiver antenna) is called TM1, and the basic TX Diversity mode is called TM2. MIMO operation without any feedback from the UE is called TM3, while MIMO with feedback from UE (e.g., in form of CSI) is called TM4. The list of TMs has been steadily enhanced over the last years. More details about the various transmission modes defined for 4G-LTE can for example be found in section 7.2 of 3GPP TS 36.213.

Transmission modes are also defined to support MIMO for data transmissions in an uplink direction (i.e. from the UE to the base station).

With the evolution of cellular technology from existing 4G-LTE systems to 5G-NR, higher frequencies come into play. For example, in 5G-NR support of two frequency ranges (FRs) was initially defined in 3GPP for Rel-15, essentially making a distinction between "below 6 GHz" carrier frequencies (known as FR1) covering the "legacy" frequencies of cellular communication systems and "above 6 GHz" carrier frequencies (known as FR2). The latter frequency range is also referred to as the "mm wave spectrum".

For wireless communication systems operating (at least in parts) on higher carrier frequencies, such as the mm wave spectrum, use of directional antennas and beam steering methods may be particularly useful.

Recently, new discussions have taken place in 3GPP to shift the upper limit of FR1 from 6 GHz to 7.125 GHz and to extend its lower limit from 450 MHz to 410 MHz. At the same time, the limits of FR2 are likely to be redefined as well, potentially as follows: It is expected that FR2's lower boundary will be set to 24.25 GHz and its upper limit to 52.6 GHz.

With respect to the upper limit of FR2, the physical layer of 5G-NR was designed to be optimized for uses below 52.6 GHz and with the potential to be used for above 52.6 GHz. However, frequencies above 52.6 GHz face more difficult challenges, such as higher phase noise, extreme propagation loss due to high atmospheric absorption, lower power amplifier efficiency, and strong power spectral density regulatory requirements, when compared to lower frequency bands.

Currently, it appears likely that a new frequency range (for example, FR4) will be defined in future 3GPP releases to allow deployment of 5G-NR on carrier frequencies above 52.6 GHz with a potential upper limit in the area around 115 GHz. What kind of physical layer adaptations are needed in detail for this frequency range (if any) for future versions of the 5G-NR standard remains to be studied still. Optimizations may potentially be required with respect to the introduction of larger bandwidths, new waveforms, and modified procedures.

As indicated above, especially for operation in higher frequency ranges (such as FR2 and/or FR4), 5G-NR may make use of smart antennas and beam forming/steering methods. In order to achieve greater reach using a given power budget or to make use of the good spatial re-use properties that radio links operated on higher frequencies offer, deployed base stations may utilize directional transmission and reception techniques to communicate with mobile communication devices. Pronounced orientation of a radio signal into a certain direction can be achieved for instance with antenna arrays, such as phased array systems (enabling beam forming with a finite number of fixed predefined coverage patterns) and/or adaptive array systems (enabling beam steering with an infinite number of patterns adjusted to the respective scenario in real time).

An antenna array is an antenna system that encompasses a certain number of distinct antenna elements. The geometrical arrangement of these single antenna elements may vary significantly and determines the beam forming characteristics as follows: arranging multiple antenna elements in a row (e.g., in a 1×8 formation) would allow for two-dimensional beam forming within a (pre-defined) dissemination plane. An arrangement in matrix format (e.g., in an 8×8 formation) would allow for three-dimensional beam forming in a (pre-defined) dissemination space.

A directional antenna orientation can be used for both transmission and reception. For example, when transmitting (Tx Beam), beamforming is the ability to direct radio energy through a radio channel toward a specific spot or into a specific direction. By adjusting the phase and amplitude of the transmitted signal at the various single antenna elements a constructive addition of the corresponding signals can be achieved, which increases the received signal strength disseminated into a certain direction. The end user may perceive this effect for instance by an improved end-user throughput. Usually, concentrated transmissions towards a certain spot or area come along with a reduction of the respective radio beam's width. Similarly, when receiving (Rx Beam), beamforming is the ability to collect the signal's energy from a specific direction.

In some scenarios, radio beams may be constantly adapted to the surroundings and/or to the movement of devices in order to steadily give high performance in both uplink (UL) and downlink (DL) direction. The beam adaptation procedure may be based on feedback provided by the corresponding peer device. This is known as beam steering.

In the scope of the present invention a direction-oriented radio link may consist of a Tx Beam (at the transmitter) and/or an Rx Beam (at the receiver) as shown in FIG. 2. In the scope of the present invention a direction-oriented radio link may also be created when only one side (Tx or Rx) has a directional antenna characteristic while on the other side (Rx or Tx) the directional antenna characteristic is not overly pronounced (i.e. the other side may even have an (almost) omni-directional antenna characteristic).

The relative phases of the respective signals feeding the distinct antenna elements forming an antenna array are set in such a way that the effective radiation pattern of the entire array is reinforced in a desired direction and—at the same time—suppressed in undesired directions. The phase relationship among the single antenna elements may be fixed (as for beam forming) or it may be adjustable (as for beam steering).

A directed antenna beam (e.g., generated by means of a one-dimensional antenna array, such as the 1×8 phased array mentioned above) usually consists of a strong main lobe pointing in the desired direction of signal reinforcement and at least one side lobe with much less intensity.

The arrangement of single antenna elements forming an antenna array may be in such a way that two wave trains of orthogonal polarization states can be transmitted and/or received over the same radio channel (i.e. using the same radio resources) at the same time. This method is known as Polarization Division Multiplexing (PDM) and explained in detail below. To achieve this, the respective antenna array is composed of two sub-arrays (one per polarization) wherein each sub-array may be designed to be controlled by a dedicated radio chain (one per polarization). For instance, at each spot of the antenna array a pair of antenna elements (each pair consists of two single elements rotated by 90 degrees) may be arranged, as explained in an internet white paper of Ericsson entitled "Advanced antenna systems for 5G networks".

As mentioned above, a new frequency range (FR4) is currently under discussion in 3GPP for 5G-NR. Due to the short wave length of radio signals to be transmitted in this new band, the antenna design for FR4 would allow more antenna elements per surface area, thereby keeping the overall size of the antenna array at reasonable levels. Thus, radio beams formed for usage in FR4 may become particularly thin. The narrower a radio beam, the less likely is the probability of experiencing reflections along the way.

The present invention has relevance in the field of unmanned aerial vehicles. The number of drones, or unmanned aerial vehicles (UAVs), is expected to grow rapidly over the next few years. Many use cases for drones, such as package delivery, search-and-rescue operations, farming, monitoring of critical infrastructure, wildlife conservation, flying surveillance cameras, and so on, would benefit from equipping drones with UE functionality and connecting these drone-UEs to a cellular communication network.

The main difference between the legacy UE population on the ground and drone-UEs operating in high altitudes are the radiation patterns of the radio waves. Due to the fact, that at higher positions, less attenuating obstacles reside between a drone-UE and the base station antennas, reflections are less likely to occur (when compared with a "legacy" zero-altitude UEs). As a result, for connecting drone-UEs to a cellular communication network, PDM-based transmission schemes look more promising over SDM-based transmission schemes.

The invention may therefore be particularly relevant for drone-UEs that often change their cruising altitude: Near ground an SDM-based transmission scheme may prove useful, while in the air a PDM-based transmission scheme may be better suited to serve a drone-UE.

Polarization-division multiplexing (PDM) is a physical layer method for multiplexing signals carried on electromagnetic waves, allowing different wave trains of information to be transmitted on the same radio resource (e.g., in the resources of a time/frequency grid according to a 4G-LTE or 5G-NR cellular communication system) by using radio waves of two orthogonal polarization states.

This multiplexing scheme is used in microwave links such as satellite television downlinks to double the bandwidth by using two orthogonally polarized feed antennas in satellite dishes. It is also used in fiber optic communication by transmitting separate left and right circularly polarized light beams through the same optical fiber.

Polarization techniques have long been used in radio transmission to reduce interference between two data streams transmitted over the same channel, particularly at VHF frequencies and beyond. Under some circumstances, the data rate of a radio link can be doubled by simultaneously transmitting two separate wave trains of radio signals using orthogonal polarization. For example, in point to point terrestrial microwave links (a scenario, in which transmitter as well as receiver are usually rigidly mounted), the transmitting antenna can have two feed antennas; a vertical feed antenna which transmits microwaves with their electric field in a vertical plane (vertical polarization), and a horizontal feed antenna which transmits microwaves on the same frequency with their electric field vectors rotated by 90 degrees towards the vertical plane (horizontal polarization). These two separate wave trains (or, data streams) can be received by vertical and horizontal feed antennas at the receiving station. For satellite communications (a scenario, in which transmitter and receiver move relatively towards each other), orthogonal circular polarization is often used instead (i.e. right- and left-handed circular polarization), as the sense of the circular rotation is not changed by the relative orientation of the antennas involved.

A dual polarization system comprises usually two independent transmitters, each of which can be connected to a single-polarization antenna. However, radiating two independent polarization states may also be achieved by means of a single dual-polarization antenna. For disseminating directed radio beams with dual polarization special antenna arrays exist (cf. explanations above with respect to sub-arrays consisting of antenna elements that are rotated by 90 degrees).

The ideal dual-polarization system lies its foundation onto the perfect orthogonality of the two polarization states, and any of the single-polarized interfaces at the receiver would theoretically contain only the part of the signal meant to be transmitted by the desired polarization, thus introducing no interference and allowing the two data streams to be multiplexed and demultiplexed transparently without any degradation due to the coexistence with the other. In real life systems perfect orthogonality between the two polarization states is hardly achieved; there is usually a certain (albeit small) degree of interference between them.

In a cellular communication system, for example implemented according to 3GPP's 4G-LTE or 5G-NR suite of standards, there is no steady relationship between the polarization states in most cases, because mobile communication devices such as handhelds or vehicles may often move and/or rotate around at least one of their axes. Thus, the polarization orientation of these type of mobile communication devices changes frequently.

Furthermore, each reflection of a polarised signal on its way from the transmitter to the receiver caused for instance by objects along (or at the side of) the direct connection can make the polarization orientation change. In fact, the polarization orientation of the first wave train may be affected by reflection in a way different from the way the polarization orientation of the second wave train is affected.

FIG. 3 depicts the reflection of a radio signal made up of two orthogonal wave trains. In this example, the radio signal is "separated" at the transmitter into a horizontal and a vertical wave train. The orthogonality of the two wave trains can no longer be guaranteed at the receiver due to reflection and/or movement or rotation of the mobile communication device.

In other words, during propagation of the radio waves prior to reflection (DoP 1) orthogonality is maintained ($\alpha=90°$), while in the propagation of the radio waves after the reflection (DoP 2) orthogonality is diminished ($\alpha^*<90°$). As can be seen from FIG. 4, the once purely horizontal wave train H (of DoP 1) has been split into a horizontal signal component $H_h$ with reduced power and a vertical signal component $H_v$ that is likely to interfere with the vertical wave train V.

FIG. 4 shows a simplified representation of a polarized signal before reflection (DoP1) and after reflection (DoP2).

Due to phase shifts caused by one or more reflections along the way, the receiver detects an attenuated component $H_h$ and a cross-polarized component $H_v$. The power imbalance between the radio signal's received components $H_h$ and $H_v$ can be very large, leading to a lower diversity gain of the radio signal in terms of diversity branches. The parameter that indicates the power difference between the average power of the co-polarized signal $H_h$ and the cross-polarized signal $H_v$, is denoted as cross-polar discrimination (XPD). High XPD values (i.e. good orthogonality; $H_v$ is small) can lead to significant degradation of the system performance in systems exploiting multipath propagation since the number of diversity branches is low. However, XPD values about 1 (poor orthogonality; $H_h$ is almost equal to $H_v$) can lead to a degradation of the system performance in systems exploiting polarization techniques. The values $\alpha^*$ and XPD are strongly related. The XPD value for the ideal $\alpha^*$ of 90° is infinity. The deviation of $\alpha^*$ from 90° will reduce the XPD value. In case of $\alpha^*=45°$ the cross-polarized component $H_v$ equals the original polarized component $H_h$ which corresponds to an XPD value of 1. This is the worst case if orthogonality is required, and the best case for exploiting multi-path propagation. To determine the polarization quality at the receiver, it is therefore sufficient to derive either XPD or $\alpha^*$.

The situation with regard to circularly polarized radiation is particularly complicated. Right hand polarized (RHP) radiation may become left hand polarized (LHP) dependent on relative refractive indices of the materials involved and an angle of incidence of the radiation at the reflector.

Multiple reflections of a polarized radio signal between transmitter and receiver may lead to a loss of orthogonality (e.g., between a vertical and a horizontal polarization plane, as shown in the example according to FIGS. 3 and 4). The effect of this is that some energy of the first wave train may be coupled into the second wave train, and vice versa. The higher the number of reflections, the more orthogonality can get lost.

In some deployment scenarios this coupling of energy is useful as this kind of interference is in fact an additional diversity branch that is added to the radio channel by signal reflection. Sometimes, e.g. when radio beams are broad or there is no pronounced signal directivity at all, it makes sense to exploit this additional diversity gain by means of appropriate receiver methods (e.g., algorithms, such as maximal-ratio combining (MRC), equal gain combining (EGC), selection combining (SC), and so on). In other cases, e.g. when radio beams are thin or line of sight (LOS) connections are possible, the diversity gain provided by orthogonal radio signals is more promising. So, it is better to avoid crosstalk between signal components as much as possible and try to go with orthogonally polarized data streams instead.

Currently there is no measurement for polarization properties and no control mechanism to transition between the two diversity approaches (exploitation of additional diversity branches versus exploitation of polarization multiplexing). The present invention provides methods to measure the antenna polarization properties and a trade-off method for a seamless transition between the two diversity configuration options. The need for such a method will arise with the deployment of FR4 in the course of 5G-NR evolution.

The present invention provides a method of detecting a reception quality of received radio signals transmitted by a transmitter with differing polarizations, the method comprising: transmitting data bearing radio signals, the data bearing radio signals having at least two differing polarizations, transmitting in addition to the data bearing radio signals at least one polarized reference signal, wherein each at least one polarized reference signal has a polarization orientation which changes between instances of the at least one reference signal in a predetermined manner, receiving at a receiver the transmitted data bearing signals and the at least one polarized reference signal, for each instance of the received at least one polarized reference signal determining a signal property in each of two polarization orientations, from the determined signal properties of the at least one polarized reference signal instances determining at least one of i) whether a polarization division multiplexing transmission scheme or a spatial division multiplexing transmission scheme should be utilised by the transmitter and ii) an optimum combination of polarization planes for the transmission of the data bearing radio signals.

The invention also provides a radio transmission system comprising a transmitter connected to an antenna system adapted to transmit signals in differing polarization planes wherein the transmission system is arranged to transmit data signals in the differing polarization planes and wherein the transmission system is further arranged to transmit at least one polarized reference signal wherein each at least one polarized reference signal has a polarization orientation which changes between instances of the at least one reference signal in a predetermined manner.

The transmitter may be an infrastructure node (e.g., a base station, a relay node, an IAB-Node, or a remote radio head) and the receiver may be a mobile communication device (in case of downlink data transmissions), or vice versa (in case of uplink data transmissions).

One scenario for this invention is the transmission of multiple data streams by means of polarized radio signals (e.g., a horizontal and a vertical wave train) on a communication channel provided by an orientation-directed radio beam that may be subject to reflection, whereas the polarization orientations are variable.

The physical layer of the air interface may be made up of physical channels and physical signals, wherein physical channels and physical signals use different sets of resources in the time/frequency grid of the air interface. In context of the present document physical channels and physical signals may further be differentiated as follows: physical channels are usually configured to carry information originating from higher layers of the protocol stack (commonly including user plane data and/or control plane data). Hence, they may form "data bearing signals". In contrast to this, physical signals do not carry information originating from higher layers. Instead, they may correspond to sets of resource elements that are used by the physical layer itself. Physical signals are usually configured to contain known sets of symbols (i.e. pre-defined sequences of data), so called "reference signals" or pilot symbols.

In a first aspect, the invention concerns the use of polarization specific reference signals.

In order to enable a receiver to detect the quality of orthogonality of the polarized radio signal for the method it is proposed that the radio signal is interspersed with at least one novel kind of reference signal.

In a first embodiment of the present invention a special polarized reference signal $RS_c$ is generated and interspersed into the radio signal(s). The special polarized reference signal $RS_c$ may consist of one or more wave trains. Ideally, the tilt angles of the polarization planes of the special polarized reference signal $RS_c$ are altered stepwise in a pre-determined manner. The special polarized reference signal $RS_c$ is independent from the two polarization planes that are kept static at the transmitter side for the data streams (or, data bearing signals) to be submitted. This allows calculation of the correlation properties (XPD values) for different polarization planes and therefore identification of alternative pairs of polarization planes at the receiver.

In a second embodiment of the present invention each wave train gets its individual reference signal $RS_x$. It is transmitted within the same polarization plane as the data to be transmitted (for instance, $RS_h$ for the horizontal wave train and $RS_v$ for the vertical wave train). This allows identification of a respective wave train's polarization plane at the receiver as well as determination of the angle α* between two polarization planes being received.

A second aspect of the invention concerns the determination of an optimal polarization at a receiver.

According to the third embodiment of the present invention, the receiver may be arranged to regularly check whether another (an alternative) pair of polarization planes exists providing lower correlation (=higher XPD value/ better orthogonality) than the one being currently used, so that the PDM-based transmission scheme can be improved, or stronger correlation, so that the SDM-based transmission scheme can be improved. The optimum XPD value is 1 or 0 dB for the SDM-based transmission scheme.

According to the fourth embodiment of the present invention, the receiver may detect when the level of correlation between the two polarization planes being used is still acceptable or no longer good enough, so that a transition from a (predominantly) PDM-based transmission scheme to a (predominantly) SDM-based transmission scheme can be initiated if required.

If it is found that given PDM settings no longer provide a performance good enough to overcome the channel properties of the wireless communication link, then an adjustment of the polarization settings can be triggered.

If it is found that PDM is no longer beneficial to be operated on the wireless communication link, then a seamless transition to a spatial division multiplexing (SDM) method, such as MIMO, can be triggered.

If it is found, that SDM will benefit from changing the polarization settings, then an adjustment of the polarization settings to continue SDM operation can be triggered.

If it is found that SDM is no longer beneficial to be operated on the wireless communication link, then a seamless transition to a PDM method can be triggered.

Thus, the generation and signalling of feedback information from the receiver to the transmitter aiming at enabling the transmitter to adjust the polarization planes for an optimal exploitation of the wireless communication link's channel properties is also part of the present invention.

The transmitter may be an infrastructure node (e.g., a base station, a relay node, an IAB-Node, or a remote radio head) and the receiver may be a mobile communication device (in case of downlink transmissions), or vice versa (in case of uplink transmissions).

Preferably, the wireless communication takes place in high frequency ranges, such as frequencies above 52.6 GHz with a potential upper limit in the area around 115 GHz, as currently being discussed in 3GPP for future releases of 5G-NR, where formation of directional transmission and reception antenna characteristics are advantageous (i.e. where radio beam forming and/or radio beam steering can be deployed).

A third aspect of the present invention concerns the provision of feedback information.

After assessment of the reference signals at the receiver, feedback (or more broadly control information) may be sent from the receiver to the transmitter.

A first type of feedback information is used to trigger at the transmitter an adjustment of at least one of the polarization planes, in particular an adjustment of at least one polarization plane used for a data bearing signal. This adjustment may result into a transmitter configuration in which orthogonality is not fully met on the path prior to reflection (e.g., on the first hop shown as DoP 1 in FIGS. 3 and 4).

A second type of feedback is used to trigger at the transmitter a transition from a (predominantly) PDM-based transmission scheme (exploiting orthogonality) to a (predominantly) SDM-based transmission scheme (exploiting multipath propagation), and vice versa.

The feedback information can for example be sent from the receiver to the transmitter in form of an information element or a message that was defined for c-plane signalling, i.e. in case of 4G-LTE or 5G-NR according to the radio resource control (RRC) protocol.

Alternatively, the feedback information can be sent from the receiver to the transmitter by means of other protocol layers, for example, in case of 4G-LTE or 5G-NR, using MAC Control Elements (MAC CEs) defined for the Medium Access Control (MAC) protocol.

A fourth aspect of the invention concerns a combination of the above embodiments. For example, the first and second embodiments can also be combined: In this case, three sets of reference signals could be used (for concurrent or subsequent submission along with the data to be transmitted): One for each polarization plane plus a (stepwise) circulating one. Firstly, the receiver checks whether alternative polarization planes are available satisfying a first threshold value for the angle α* and secondly, the receiver compares the angle α* measured between the two active polarization planes against a second threshold value. Only if this comparison fails too, the transition from PDM to SDM is initiated.

A change of polarization planes (that may occur after one or more reflections) in a wireless data transmission can be compensated (regardless of how many reflections the radio signal was exposed to) during system operation. Hence, the transmission properties of a cellular communication system can be improved, especially for deployment of FR4 in the course of 5G-NR evolution.

Cross-correlation can be minimized and orthogonality can be maintained for PDM-based transmission schemes by switching to an alternative pair of polarization planes with a level of cross-correlation that is lower than the one prior to switching.

The correlation between signals received from different transmit antennas can be improved for SDM-based transmissions schemes, by switching to an alternative pair of polarization planes with a level of cross-correlation that is higher than the one prior to switching.

A smooth transition from a PDM-based operation to SDM-based operation is also enabled if the level of cross-correlation (e.g., provided by the (entirety of) alternative pair(s) of polarization planes found) is no longer acceptable.

In a further aspect, the invention provides a method of detecting a reception quality of received radio signals transmitted by a transmitter with differing polarizations, the method comprising transmitting data bearing signals using two differing polarization planes, transmitting reference signals with the data bearing signals in the polarization planes, at a receiver, determining an angle between polarization planes of the reference signals, and reporting by the receiver information concerning the determined angle to the transmitter. In the method the receiver may report information concerning the angle only when the angle is below a pre-determined threshold.

Preferred embodiments of the invention will now be described, by way of example only, with reference to the accompanying drawings in which.

The detection of alternative polarization planes according to a first embodiment of the invention will now be described.

Two special reference signals $RS_{c,j}$ are generated and interspersed into the radio signal. The two reference signals have polarization planes with a given circular offset to each other (of typically 90 degrees) and they simultaneously change their circular shift with about the same step size, so that the offset between them is always identical (typically 90 degrees).

The polarization planes of the two special reference signals $RS_{c,j}$ are independent from the two polarization planes used for data bearing signals that are kept static as a horizontal and a vertical wave train.

A time/frequency resource grid of the cellular communication system's air interface may be configured with resource elements (different from the ones used for data transmission) that appear more often and/or are long enough to accommodate the special reference signals $RS_{c,j}$. The transmitter may be configured in such a way that the special reference signals $RS_{c,j}$ rotate step-wise along the direction of propagation (DoP). For example, a full rotation of 360° can be performed in 36 steps of 10° each in clockwise or counter-clockwise direction (or any other step width if appropriate) over a given period of time. In one embodiment the reference signals $RS_{c,j}$ consist of multiple parts (one for each rotational step) and each part i of the reference signal $RS_{c,j,i}$ should be uniquely identifiable, thereby making each step uniquely identifiable. The receiver will be configured with the step-duration (e.g. in milliseconds) and the step-size (e.g. in degrees) and the used reference sequences in order to perform the measurements. This may be done either by pre-configuration or by c-plane signalling, i.e. by transmission of an information element or a message that was defined for c-plane signalling (in case of 4G-LTE or 5G-NR according to the Radio Resource Control (RRC) protocol), before the measurement takes place.

Figure 5:
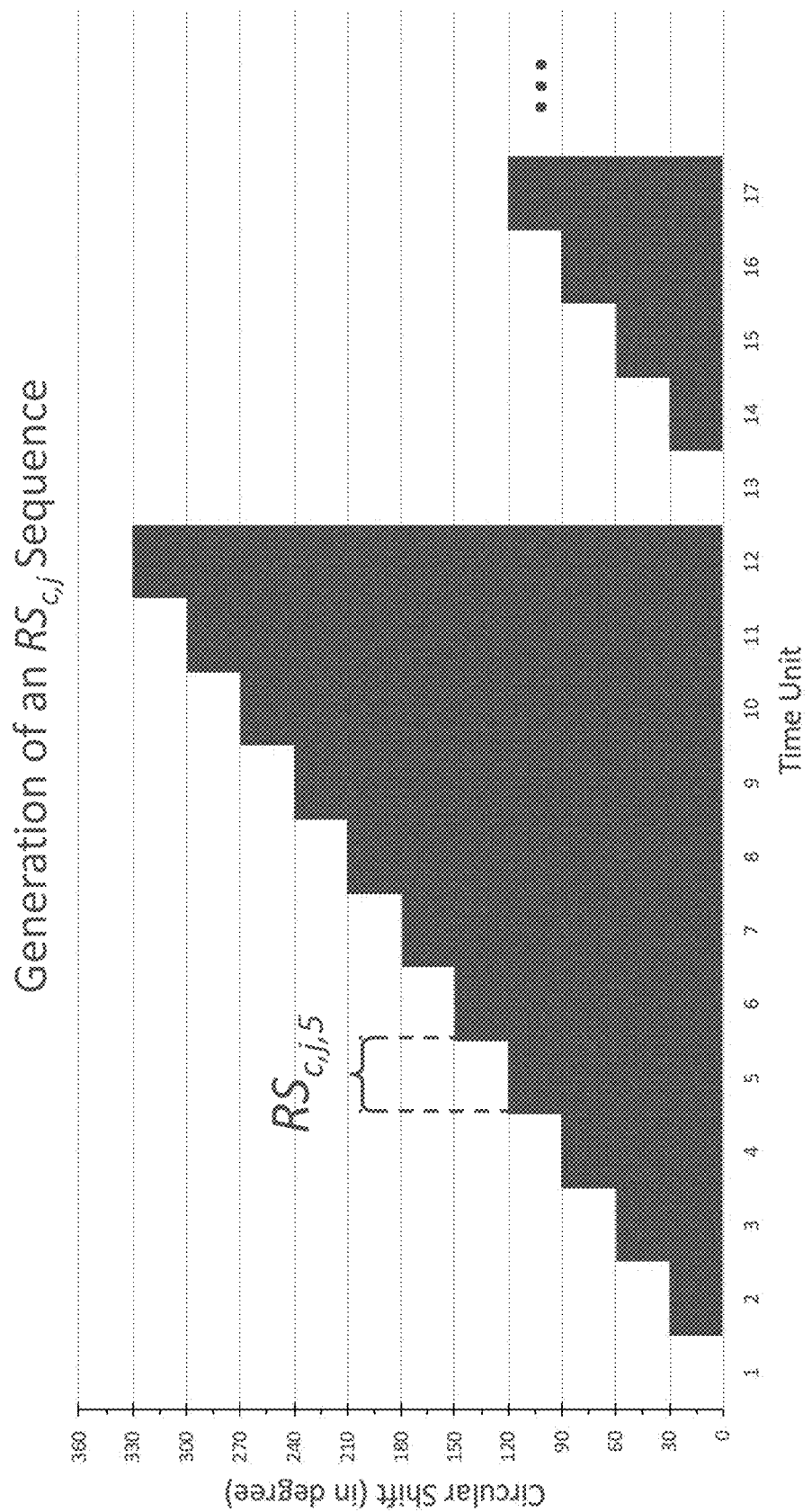
FIG. 5 is an illustrative example of a time sequence of polarization orientations.

FIG. 5 shows an example for an $RS_{c,j}$ sequence that is shifted in 12 steps of 30° each. In this case, the reference signal $RS_{c,j}$ would consist of i=12 (ideally) uniquely identifiable parts $RS_{c,j,i}$. Each part consumes a time unit, which may correspond to (multiples of) a symbol duration or a sub frame or a radio frame or a transmission time interval (TTI) of the respective air interface's physical layer numerology. Each part needs to be sufficiently long in duration to measure the relevant signal properties (e.g., the SNR, the signal quality, the data rate, and/or the signal strength) of the related sequence part.

In one example, the receiver may be configured to let the polarization plane orientation of its Rx antenna system rotate around the DoP (e.g., through the 360° of a circle) for reference signal detection. In one embodiment of the present invention it may be beneficial to agree upon the starting point and/or timing of an $RS_{c,j}$ sequence among transmitter and receiver. Similar to the above, this may be done either by pre-configuration or by c-plane signalling, i.e. by transmission of an information element or a message that was defined for c-plane signalling (in case of 4G-LTE or 5G-NR according to the Radio Resource Control (RRC) protocol), before the measurement takes place.

A rotation of the reference signal is only one possibility. It is also possible to transmit the reference signal with a rotation angle between instances which does not change in a regular manner but follows a predetermined sequence.

In the following example, we are looking at special reference signals $RS_{c,j}$ that are generated by the transmitter as a horizontal (j=h) and a vertical (j=v) pair of reference signals and interspersed into the radio signal:

The receiver is configured to perform measurements to derive the signal strength S of $RS_{c,h}$ and $RS_{c,v}$ via a vertically polarized receive antenna and via a horizontally polarized receive antenna. Therefore, it derives four values for each rotational step: $S_{c,hh}$, $S_{c,hv}$, $S_{c,vv}$ and $S_{c,vh}$. In the index, the last letter (h or v) indicates the polarization of the receiver antenna and the last but one letter indicates the polarization at the transmitter. Now, the receiver derives the cross polar discriminations (XPD) for the current rotational step i with the following equations:

$$XPD_v(i) = \frac{S_{c,vv}}{S_{c,vh}} \qquad \text{equation 1}$$

$$XPD_h(i) = \frac{S_{c,hh}}{S_{c,hv}} \qquad \text{equation 2}$$

$XPD_v(i)$ is the XPD value for the vertical polarized receive antenna and $XPD_h(i)$ the XPD value of the horizontal polarized receive antenna.

The measurement is repeated for the next rotational steps until a sufficient number of $XPD_v$ and $XPD_h$ values was derived to identify the step count i (and thereby the rotation angle) with the maximum XPD, if a PDM-based transmission scheme is currently applied, or the minimum XPD, if a SDM-based transmission scheme is applied, or both, if there is no big difference between the maximum and minimum values. In the following, the term "XPD" may refer to both $XPD_v$ and $XPD_h$, and the described procedures have to be performed for both XPD values individually.

The XPD values would allow detection of (pairs of) alternative polarization planes that are either suited for orthogonal signal reception (XPD is much greater than 1, e.g. at least 10 (=10 dB)) or multipath reception (XPD is about 1) at the receiver (even when these are located outside of the polarization planes that are currently being used for the orthogonal data streams).

If PDM is currently applied, it is verified whether at least one of the maximum XPD values of the Reference Signals and the XPD values of the currently used polarization for data transmission (derived from the $RS_c$ with the matching rotation angle, which was indicated to the receiver previously) is below a first threshold value (e.g. 10 dB), in this case, the need to change the transmission scheme from PDM-based to SDM-based is detected. The related behaviour is explained below.

If SDM is currently applied, it is verified whether the minimum XPD values of the Reference Signals and the XPD values of the currently used polarization for data transmission is above a second threshold value (e.g. 3 dB), in this case, the need to change the transmission scheme from SDM-based to PDM-based is detected. The related behaviour is explained below.

Otherwise the current propagation properties indicate suitability for the currently used transmission scheme.

In case, PDM is currently used, the maximum XPD values are then compared to the XPD values provided by the polarization planes currently being used. If at least one maximum XPD value is about a third threshold above the current XPD (e.g. 1 dB), a polarization re-configuration will lead to an enhanced reception quality. Therefore, a first type of feedback information is sent from the receiver to the transmitter.

In case of SDM, the minimum XPD values are used for the comparison with the current XPD values. If at least one minimum XPD value is about a fourth threshold below the current XPD (e.g. 0.5 dB), a polarization re-configuration will also in this case lead to an enhanced reception quality and the first type of feedback information is sent.

As explained above, instead of XPD values the angle $\alpha^*$ between the two polarization planes could be used for these decisions and comparisons. E.g. in case of PDM, a first threshold could be defined as $\alpha_{t1}=80°$ and if the maximum and the current $\alpha^*$ are below this threshold, the need to change the transmission scheme from PDM-based to SDM-based is detected.

Figure 1:
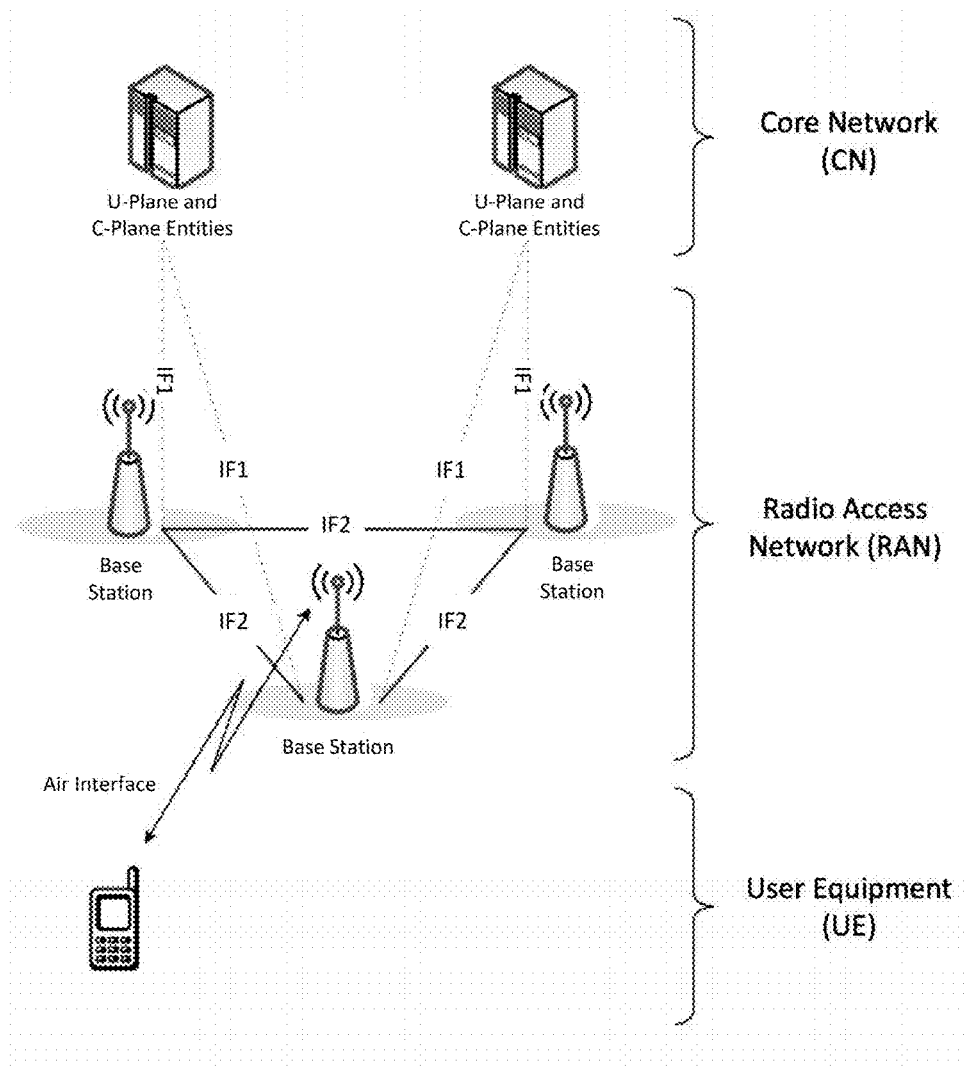
FIG. 1 is a schematic representation of a cellular communication system according to 3GPP.
Figure 2:
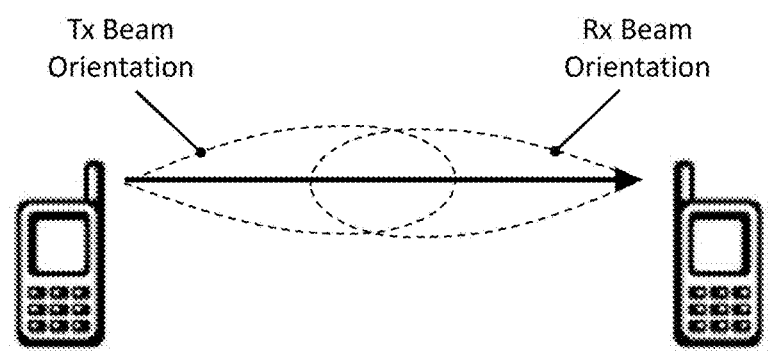
FIG. 2 is a schematic representation of a transmit beam and a receive beam forming a direction-oriented link between two devices.
Figure 3:
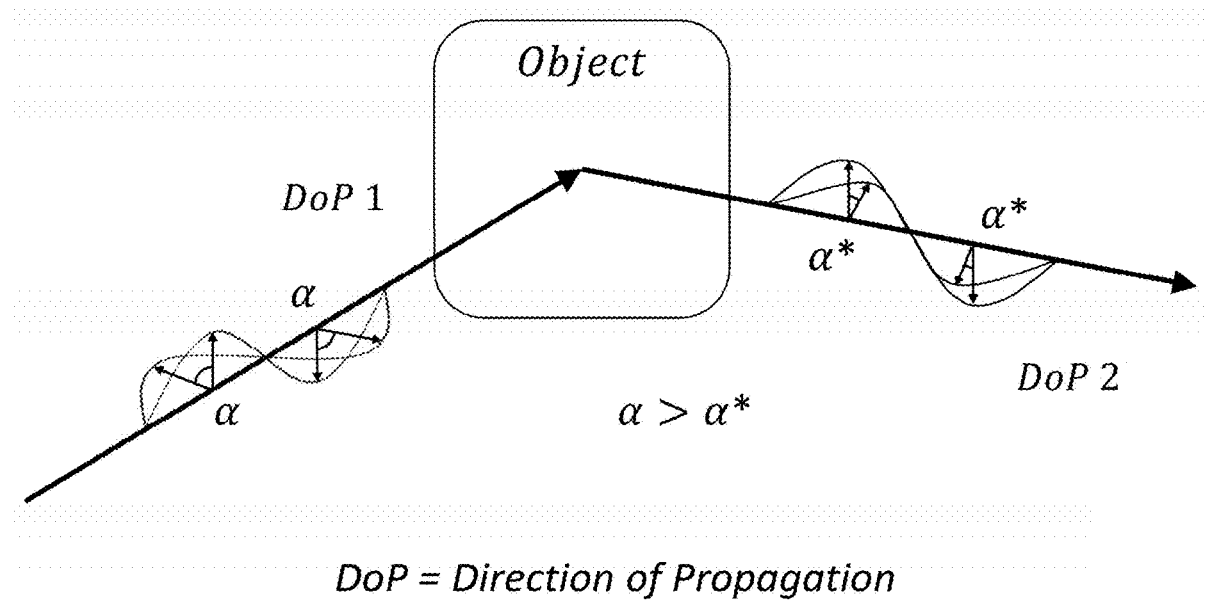
FIG. 3 illustrates the effect of reflection on the polarization of a polarized signal.
Figure 4:
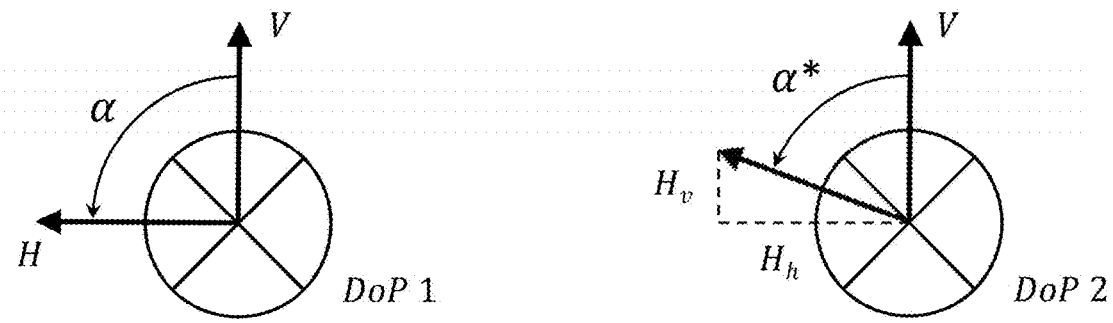
FIG. 4 is a simplified illustration of a polarized signal before and after reflection.
Figure 6:
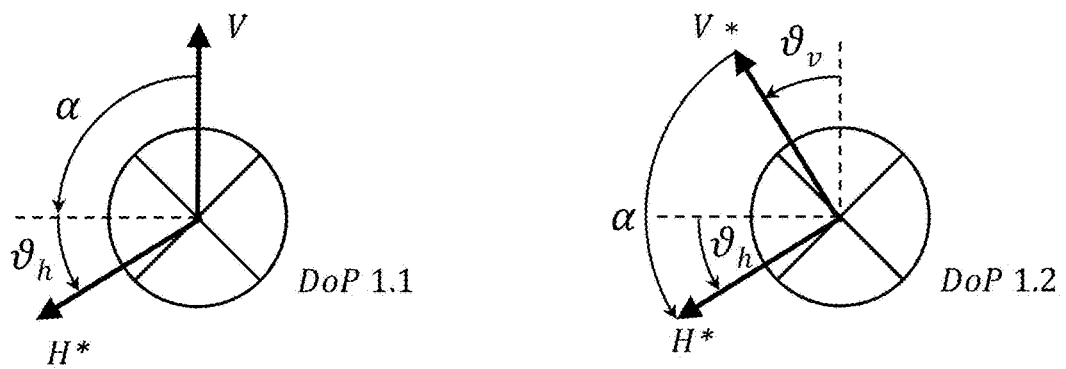
FIG. 6 shows two examples of polarization correction at the transmitter.

The first feedback may contain an indication as to which polarization planes are suited to serve as alternative polarization planes. The indication can be done by using the step count i of the related time units which delivers the best polarization properties. In a second variant multiple step counts are indicated, e.g. the "top three", i.e. the step counts of the reference signals that offer the three best suited XPD values. This is done individually for the $XPD_v$ and $XPD_h$. After reception by the transmitter, the first feedback may trigger a rotation of the polarization plane(s) along the DoP trying to continue the currently applied transmission scheme. This "plane tilt" with tilting angle ϑ may occur at the transmitter for one polarization plane only (as shown on the left of FIG. 6, where only one vector (here: the horizontal one) is tilted) or for both planes (as shown on the right of FIG. 6, where both the horizontal and the vertical vectors are tilted). The key point is, that based on the first type of feedback information those polarization planes (i.e. tilt angles) are selected at the transmitter that have been detected as good alternatives (i.e. providing a sufficient degree of polarization correlation as required for the currently applied transmission scheme) at the place of the receiver.

A second embodiment of the invention will now be described concerning the detection of a need to change a transmission scheme.

For a radio signal made up of two orthogonal wave trains of data bearing signals two individual reference signal $RS_x$ are generated and interspersed into the radio signal—one for each wave train: For example, a horizontal reference signal $RS_h$ is transmitted within the same polarization plane as used for the data to be transmitted with the horizontal wave train and a vertical reference signal $RS_v$ is transmitted within the same polarization plane as used for the data to be transmitted with the vertical wave train. When reflection occurs, a reference signal would change its orientation along with (i.e. in the same way as) the corresponding polarization plane. This allows identification of a respective wave train's polarization plane at the receiver as well as determination of the angle $\alpha^*$ between two polarization planes being received.

When it is detected that an angle $\alpha^*$ between the two polarization planes is below a pre-defined or configured second threshold value (e.g., $\alpha_{t2}=75°$), then the receiver may decide that the level of orthogonality between the two polarization planes being currently used is no longer good enough. In this case, a second type of feedback information may be sent from the receiver to the transmitter.

Said second feedback may contain an indication that orthogonality between polarization planes as seen by the receiver is not (or, no longer) sufficient. After reception by the transmitter, the second feedback may trigger a transition from a (predominantly) PDM-based transmission scheme (exploiting orthogonality) to a (predominantly) SDM-based transmission scheme (exploiting multipath propagation).

A transition into the other direction, i.e. from a (predominantly) SDM-based transmission scheme (exploiting multipath propagation) to a (predominantly) PDM-based transmission scheme (exploiting orthogonality), may also be triggered, for instance when another (or the same) threshold value is exceeded. Additionally, offset values may be configured to achieve a hysteresis loop for the transitions.

The decision to change the transmission scheme can also be based on measurements of the stepwise rotating reference signals $RS_{c,j,i}$ instead of the reference signals $RS_h$ and $RS_v$. This would allow a more precise decision, as all possible tilt angles are considered instead only the currently used angles. On the other hand, using $RS_h$ and $RS_v$ requires less amount of radio resources for the reference signals, the measurement can be performed faster, and calculating the results requires less power.

As mentioned above two different types of feedback information may be sent from the receiver to the transmitter. Both types of feedback information are ideally transmitted from the receiver to the transmitter in form of radio resource control (RRC) protocol enhancements (i.e., in form of new or modified information elements and/or messages for use in the RRC protocol according to 4G-LTE or 5G-NR). Alternatively, both types of feedback information are sent from the receiver to the transmitter by means of other protocol layers, for example, in case of 4G-LTE or 5G-NR, using MAC Control Elements (MAC CEs) defined for the Medium Access Control (MAC) protocol.

The first type of feedback may contain an indication as to which polarization planes are suited to serve as alternative polarization planes (as measured by the receiver), and the transmitter is expected to react with a "plane tilt" operation (e.g., according to FIG. 6) in order to enable operation with a sufficient high or low degree of correlation between the two polarization planes, according to the needs of the currently applied transmission scheme.

Optionally, the transmitter may inform the receiver about the "plane tilt" operation performed, for example by means of RRC or MAC protocol enhancements.

The second type of feedback may contain an indication that correlation properties between the polarization planes currently used is found by the receiver to be no longer sufficient, and the transmitter is expected to transition from a (predominantly) PDM-based transmission scheme to a (predominantly) SDM-based transmission scheme (i.e., from exploiting orthogonality to exploiting multipath propagation) or vice-versa.

Optionally, the transmitter may inform the receiver about the transition from one transmission scheme to another, for example by means of RRC or MAC protocol enhancements.

When the first and the second embodiment of the present invention are combined (e.g., sequentially or concurrently), the receiver may compare the XPD values measured between the two active polarization planes against the maximum (in case PDM is currently applied) or minimum (in case SDM is currently applied) XPD value of the alternative polarization planes, and if the XPD values of alternative planes will lead to a transmission improvement, the first type of feedback is send in order to adjust the polarization at the transmitter accordingly. If no improvement could be derived for the current transmission scheme by changing the polarization, the receiver will check the polarization properties for another transmission scheme (e.g. for SDM if PDM is currently applied). Therefore, the receiver first checks whether alternative polarization planes are available satisfying a first threshold value $\alpha_{t1}$ for the angle $\alpha^*$ and secondly compares the angle $\alpha^*$ measured between the two active polarization planes against a second threshold value $\alpha_{t2}$ (or vice versa). The various threshold values may be configurable to measure/investigate/determine the polarization ability of the radio channel for a transmission scheme other than the one currently applied.

If at least one comparison was positive, i.e. the related threshold criterion is satisfied, a change to an alternate transmission scheme is useful.

In this case the first and the second feedback information may also be combined in a single information element or in a single message to be transmitted from the receiver to the transmitter. Ideally, established c-plane signalling methods of the corresponding cellular communication system's air interface are enhanced accordingly, i.e. in case of 4G-LTE or 5G-NR the information elements and/or messages of the RRC protocol are enhanced accordingly.

Alternatively, the feedback information can be sent from the receiver to the transmitter by means of other protocol layers, for example, in case of 4G-LTE or 5G-NR, MAC Control Elements (MAC CEs) defined for the Medium Access Control (MAC) protocol are enhanced accordingly.

In case that the comparison was negative, i.e. the polarization properties are not suited for the alternate transmission scheme, the comparison may be repeated with threshold values for another transmission scheme. Alternatively, a transmission scheme may be selected which is not affected by polarization.

The invention claimed is:

1. A method of detecting a reception quality of received radio signals transmitted by a transmitter with differing polarizations, the method comprising:
transmitting data bearing radio signals, the data bearing radio signals having at least two differing polarizations,
transmitting in addition to the data bearing radio signals at instances over time at least one polarized reference signal, wherein each at least one polarized reference signal has a polarization orientation which changes between instances of the at least one reference signal in a stepwise manner with steps of less than 90° and which has a polarization plane independent from the polarizations of the data bearing radio singals,
receiving at a receiver the transmitted data bearing signals and the instances of the at least one polarized reference signal,
for each instance of the received at least one polarized reference signal determining a signal property in each of two polarization orientations,
from the determined signal properties of the at least one polarized reference signal instances determining at least one of
i) whether a polarization division multiplexing transmission scheme or a spatial division multiplexing transmission scheme should be utilised by the transmitter and
ii) an optimum combination of non-orthogonal polarization planes for the transmission of the data bearing radio signals, such that an angle α between the two differing polarizations is an angle other than 90°.

2. The method according to claim 1, wherein two polarized reference signals are transmitted with a predetermined difference in polarization therebetween.

3. The method according to claim 2, wherein the two reference signals have polarizations which are rotated by a predetermined angle between instances thereof.

4. The method according to claim 1, wherein cross polar discrimination values are obtained for the two polarization orientations for each instance of the at least one reference signal and at least one of a maximum and a minimum cross polar discrimination value is obtained for each polarization orientation.

5. The method according to claim 4, wherein the maximum cross polar discrimination value is compared with a threshold value for determining which multiplexing transmission scheme should be utilised.

6. The method according to claim 1, wherein each step is less than 45°.

7. The method according to claim 6, wherein each step is less than 15°.

8. A radio transmission system comprising a transmitter connected to an antenna system adapted to transmit signals in differing non-orthogonal polarization planes wherein the transmission system is arranged to transmit data signals in the differing non-orthogonal polarization planes, such that an angle α between the differing non-orthogonal polarizations is an angle other than 90° and wherein the transmission system is further arranged to transmit at least one polarized reference signal wherein each at least one polarized reference signal has a polarization orientation which changes between instances of the at least one reference signal in a stepwise manner with steps of less than 90° and which has a polarization plane independent from the polarizations of the data bearing radio signals.

9. The radio transmission system according to claim 8, wherein the transmission system is arranged to receive reception quality information from one or more receivers concerning a reception of the at least one polarized reference signal and to perform at least one of
  i) a change in a data signal multiplexing method in response to the reception quality information and
  ii) an adjustment of relative orientations of the non-orthogonal polarization planes.

10. The radio transmission system according to claim 9, wherein the radio transmission system is part of an unmanned aerial vehicle.

11. The radio transmission system according to claim 10, wherein the unmanned aerial vehicle is served using a PDM-based data signal multiplexing method at relatively higher altitudes and using an SDM-based data signal multiplexing method at relatively lower altitudes, nearer to the ground.

12. The radio transmission system according to claim 8, wherein the transmission system is arranged to transmit two polarized reference signals with differing polarizations, the differing polarizations being rotated between successive instances of the polarized reference signals.

13. The radio transmission system according to claim 8, wherein each step is less than 45°.

14. The radio transmission system according to claim 13, wherein each step is less than 15°.

15. A method of detecting a reception quality of received radio signals received by a receiver having an antenna arrangement capable of receiving polarized radio signals in differing polarization planes, the method comprising:
  receiving data bearing signals having at least two differing polarization planes and at least one polarized reference signal having a polarization plane independent from the polarizations of the data bearing radio signals,
  for each instance of the received at least one polarized reference signal determining a signal property in each of two polarization orientations,
  from the determined signal properties of the at least one polarized reference signal instances determining at least one of
  i) whether a polarization division multiplexing transmission scheme or a spatial division multiplexing transmission scheme should be utilised by a transmitter and
  ii) an optimum combination of non-orthogonal polarization planes for the transmission of the data bearing radio signals, such that an angle α between the two differing polarizations is an angle other than 90°.

* * * * *